United States Patent Office 3,114,677
Patented Dec. 17, 1963

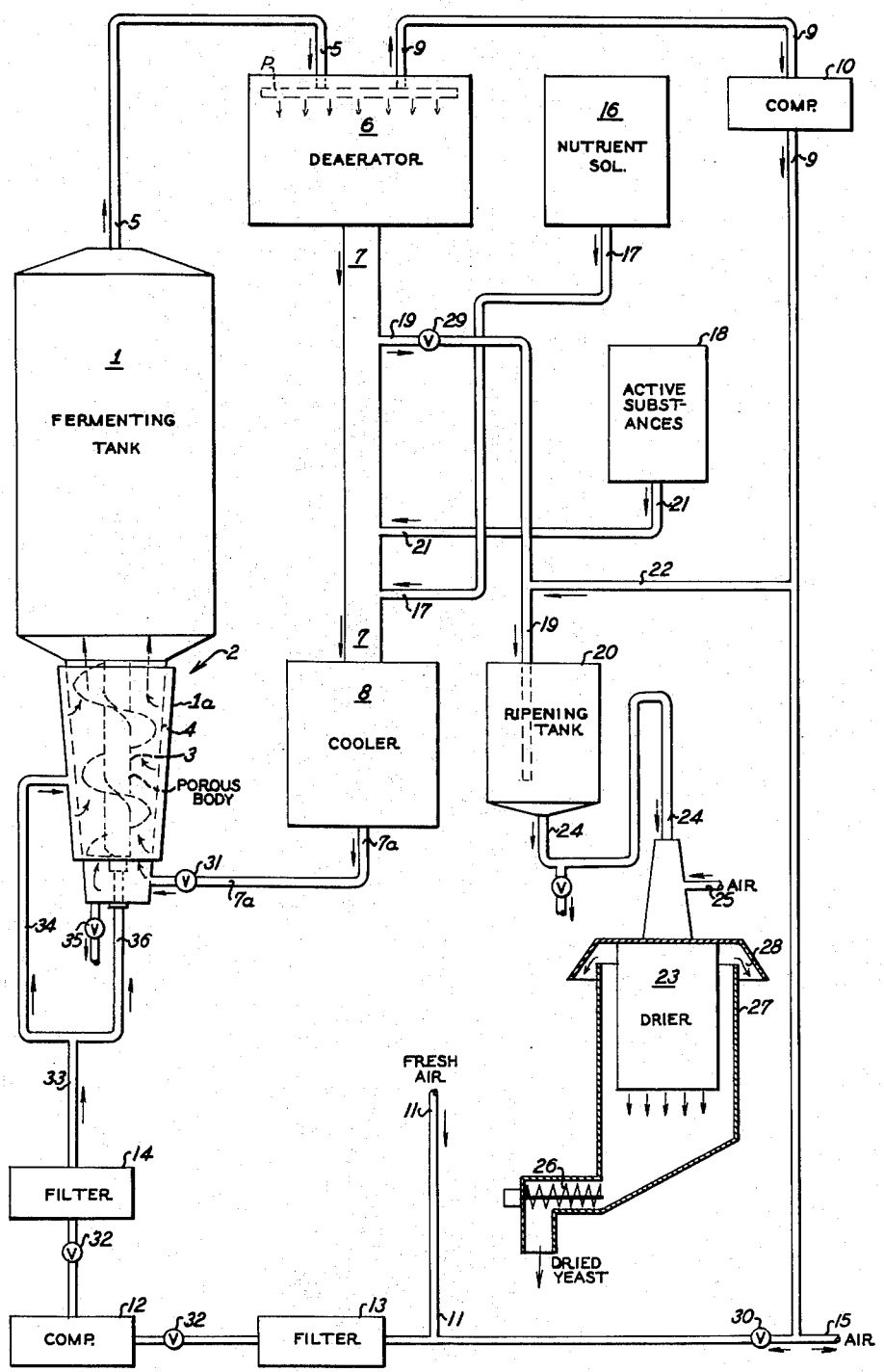

3,114,677
FERMENTATION APPARATUS
Eugen Stich, Richard Wagner Strasse 31,
Mannheim, Germany
Filed July 25, 1961, Ser. No. 126,636
Claims priority, application Germany July 28, 1960
4 Claims. (Cl. 195—142)

This invention relates to processes and apparatus for the production of fermentation agents, and more particularly to the production of yeast by the use of fermentable liquids.

In a known discontinuous procedure for the aeration of liquids, and especially fermentable liquids, air is fed to the fermentable liquid at the bottom portion of a fermenting vessel by means of an air distributing device and at the top portion of the fermenting vessel is a skimmer with a pipe connected thereto and located outside of the vessel to recycle the skimmed liquid to the fermenting vessel. The air, instead of being fed directly to the fermenting vessel, can be supplied to the externally located recycling pipe. Fresh nutrient solution is fed to the fermentable liquid and directly to the fermenting vessel by way of a trickling or spray device. An adjustable nozzle arranged in the fermenting vessel makes it possible to adjust the height of a separation zone between an upper layer rich in air and a lower layer which is poorer in air. The content of the vessel is circulated by means of a pump by way of a by-pass.

This known arrangement makes it impossible to obtain a continuously circulating stream of fermentable liquid for a continuous withdrawal of the fermentation product outside of the fermenting vessel. Only foam or froth representing only a very small amount of liquid flows through the by-pass which is connected to the skimmer. After this liquid has been skimmed, and after the foam has been freed of its gas content, a stream of such little magnitude flows back into the fermenting vessel that circulating of the mass of fermentable liquid is not insured thereby. Rather, the circulating of the liquid mass itself is, as indicated above, effected by a pump by way of a further by-pass. Moreover, since an airing device consisting of a porous body is conventionally inserted in the skimming cycle by-pass so that the escaping air is able to rise to the skimmer, a continuous flow is not possible.

An object of the invention is to provide improvements in techniques for the continuous production of fermentation products and in the guiding of fermentable liquids employed in connection therewith. The invention is characterized in that the mass of fermentable liquid in a fermenting vessel is so expanded by constant mixing with air in the proportion by volume of 1:1 that the fermentable liquid, having reached its maximal rise, overflows automatically together with the enriched fermentation products into another chamber which serves as a by-pass. From this by-pass, the increase in fermentation products in the fermentable liquid is continuously withdrawn after deaeration. Moreover, nutrient solution is fed to the remaining mash liquid, flowing back to the fermenting tub in a volume corresponding to the increase in fermentation product that has been withdrawn.

Advantageously, this method permits obtaining a continuous circulation of all of the fermentable liquid, a free circulating process caused by the fermentation process taking place without additional mechanical means, such as, for example, a pump or the like, in a natural manner.

According to one feature of the invention, the deaerating of the fermentable liquid takes place in a chamber which is outside the fermenting tub and which is arranged at the maximum height of ascent of the fermentable liquid. This permits sufficient deaerating of the fermentable liquid, so that it is possible to withdraw the growing fermentation products from the deaerated mash.

According to a further feature of the invention, the mash flowing back into the fermenting tub is immediately thereafter enriched with a nutrient solution, so that the nutrient solution together with the returning mash must necessarily pass through the entire deaerating device. This results in a high efficiency for the production of the fermentation products.

According to the invention, there results a high concentration of the fermentation product in the mash at the lowest possible volume of production. The entire content of the fermenting tub is entrained in the natural circulation and is fed continuously to the deaeration zone and the place of withdrawal for the fermentation product produced, the subsequently added nutrient solution taking part in the entire circulation cycle.

According to another feature of the invention, the continuously withdrawn growth of fermentation products is fed to a ripening tub to which air is fed separately. The fermentation product remains in this ripening tub with continuous influx and discharge until the ripening process is completed. Due to the fact that the ripening of the fermentation product takes place independently of the process in the fermenting tub, the previously required ripening period for the fermenting tub can be dispensed with. This saving increases the production capacity of the plant. In addition, the ripening process can take place without disturbing the products, and this contributes to an acceleration of the production process.

According to a further feature of the invention, the amount of mash of the ripening tub is, moreover, advantageously fed, in a continuous operation, to a drying and evaporating device in which the amount of mash accumulating is mixed with an appropriate amount of air. The amount of air in the drying and evaporating tub amounts to many times the mash volume fed to the tub. In this manner, an evaporating of the mash can be effected so that the actual fermentation product can be removed from the evaporating tub in a dry state for immediate use. This makes it possible to dispense with the conventionally used separators and filter presses. The freedom from infection of the yeast obtained is improved and transportation costs are reduced. The overall result is a continuous process for the production of yeast or the like.

In order to obtain an extraordinary mixture of air with the mash mixed with the nutrient solution in accordance with yet another feature of the invention, the airing device in the bottom portion of the fermenting tub is advantageously arranged so that said airing device is disposed in a portion constricted with respect to the fermenting tub and extends in the direction of the longitudinal axis of the fermenting tub. Provision can be made for members to stir the mash. Further, a cooling device is advisably arranged on the single by-pass conduit conducting the remaining mash liquid into the fermenting tub. The outgoing air recovered in the deaerating device can be fed to the fermenting tub and/or to the ripening tub after having been suitably filtered. A sufficient amount of fresh air is to be added to said outgoing or waste air prior to its entering the fermenting tub.

The subject matter of the invention will now be explained with reference to the accompanying drawing in which the sole FIGURE is a diagrammatic view of a plant according to the invention for the production of fermentation products or agents in a continuous cycle.

In the bottom portion of a fermenting and yeasting tub 1 is an airing or aeration device 2 which is disposed in a narrowed or constricted portion 1a of the tub. The airing device 2 consists of a porous body 3 about which a spiral blade or worm 4 is arranged. The constricted tub portion 1a tapers slightly toward the tub 1.

From the fermenting tub 1, a conduit or pipe 5 leads to a container, which is adapted to receive the mash enriched with fermentation agents or products such as, for example, yeast. The deaeration is effected in this container.

Connected to said container 5 is another conduit 7, which is partially or wholly surrounded with a cooling device 8. The conduit 7 is connected, by way of the pipe 7a, to the bottom portion 1a of the airing device for the fermenting tub 1.

Also connected to the container 6 is a waste-air or outgoing air piping or conduit 9 which may lead to a ventilator compressor 10, or the like. Said air piping 9 is connected to the airing device. A fresh-air piping 11 leads into said outgoing-air piping 9.

Element 12 is another compressor, and elements 13 and 14 are a coarse filter and a bacteria filter or the like. The outgoing air can be discharged into the atmosphere at 15.

A piping 17 leads from a container 16, containing a nutrient solution, to the pipe 7. In addition, a container 18 may be provided which contains additional active substances. Arranged above the feed place of the nutrient solution is a piping 19, by means of which the concentrated fermentation products or agents are removed and are conducted to a ripening container 20. The active substances in the container 18 can be fed, by means of the piping 21, both to the pipe 7 for the returning mash and to the piping 19 which leads to the ripening container 20.

A piping 22 leads from the outgoing-air piping 9 to the ripening container 20. A drying or evaporating device 23 is connected to the ripening container. Said device 23 is connected to the container 20 by the piping 24. At the opening 25 air is fed to the evaporating device. The dried yeast can be withdrawn, ready for use, from the entire plant by way of a discharge device 26 such as, for example, the worm. The container 23 is in a jacket 27, which is provided with an outgoing-air pipe 28. Regulating valves 29, 30, 31 and 32 are provided for regulating the entire working process.

The volume of air fed to the mash corresponds to the air requirement; the amount of mash circulating per second is mixed in equal volume with the air in mixer 2 underneath the fermenting and yeasting tub 1. The air-containing mash passes through the piping 5 into the container 6, in which at the same time a deaeration takes place by exhausting the air through the piping 9.

The mash enriched with fermentation products flows back after the deaeration through the pipe 7 and the cooler 8 into the mixer or airing device 2, so that an amount of mash is continuously deaerated in the container 6 and is able to circulate again in a cycle to the mixer 2, freshly aired.

The increase or growth of yeast which is in the mash is conducted with the mash into the ripening tub 20, to which outgoing air is fed. An amount of nutrient solution is fed in equal volume to the returning mash through the piping 17. The container 18 may contain active substances, which can be conducted both to the mash flowing from the container 6 and to the ripening tub 20, as required.

The air is exhausted from the container 6 through a compressor 10 and is either conducted into the atmosphere, in case of exclusive yeast production, in accordance with the volume of fresh air added, or is partly mixed with fresh air in case of simultaneous yeast and spirit-alcohol production, in order then to be used for the airing of the fermenting tub 1 through the compressor and filter arrangement 12, 13 and 14. This method has the result that the amount of airing and, hence, the circulation of the mash remains constant.

The mash is conducted from the ripening tub 20 into drying and evaporating apparatus 23 and is mixed with air introduced through the opening 25. The amount of air added is many times the volume of mash and air fed so that a rapid and good evaporation of the mash takes place and the yeast can be withdrawn from the evaporating tub in dry state for immediate use.

The temperature of the air is advisably such that the temperature of the dry yeast has a maximum of about 30° and is then cooled to less than 30° for shipping purposes. The cooled dry yeast thus suffers no change when in the hands of the consumer. It is another advantageous result that there is no decrease of the leavening power of the dried yeast as compared to pressed yeast.

The process according to the invention produces a longer stability of the yeast cells. The expression "dry yeast" refers to yeast with about 25% absolute dry content. An infection of the pitching yeast is avoided by the breeding thereof in the closed system according to the invention. The size of the drying container depends on the amount of mash flowing into it from the ripening tub 20 and on the amount of air required for the evaporation or desiccating of the mash.

In the mixer 2, i.e., in the airing device in the fermenting tub 1, the spiral guide faces 4 are to be arranged, if possible, as a plurality of turns, so that the mash receives an additional circular motion and increase of its speed in the mixer, which results in a decrease of the size of the bubbles.

The collecting vessel 6 for the yeast-containing mash is connected to the mixer for air and mash. It contains twice the amount of the amount of so-called pitching yeast designed for the increase or propagation and, in addition, the amount of mash with its yeast content which is present in the pipings from the collecting vessel to the mixer.

Upon starting the operation, air is first conducted from the compressor 12 through the second filter 14 into the mixer. The mash is then fed from the mash container 6 into the mixer, the amount of mash corresponding to the amount of air supplied. The air-containing mash then flows from the mixer into the yeasting tub 1 and, from the latter, flows back into the mash collecting container 6 by way of a deaerating device consisting of a plate P with a perforated bottom. The aired mash running into the container passes in jets through the holes in the bottom of the plate. The resulting foam or froth is destroyed by an anti-foam agent and the air is exhausted by the ventilator 10 which is connected to the piping 9. The amount of mash in the container remains constant until introduced into the mixer and insures, by the hydrostatic head, the completely automatic recycling of the mash from the mash collecting vessel into the mixer into the yeasting tub and through the deaerator again into the yeast collecting vessel.

The process of the invention is applicable to all types of fermenting agents. For the production of yeast, the chief constituent of the nutrient solution consists of molasses, for baking yeast additionally of nitrogenous ingredients. As active substances for the production of yeast may be used hormones. The dosing of air in the aeration device 2 is advantageously effected in such a manner that 6 to 8 liters of air per second are fed to the mash for 100 kg. of yeast contained in the mash.

What is claimed is:

1. In an apparatus for use in the production of fermentation products by means of maximum aeration of fermentable liquids, a fermentation tank, means for conducting the fermentable liquid outside said fermentation tank for deaeration and means for subjecting it to continuous aeration by addition of air, the said aeration means being disposed at the bottom of the fermentation tank, a housing forming part of said aeration means, the said housing having a cross section increasing towards the fermentation tank, wall means forming a circumferential air space in said housing, a perforated tubular body extending along the central axis of said housing, means for introducing fresh air into said circumferential air space and from there at selected places into said housing, and means for introducing fresh air into said tubular body and therefrom into the interior of said housing.

2. In an apparatus for use in the production of fermentation products by means of maximum aeration of fermentable liquids, a fermentation tank, means for conducting the fermentable liquid outside said fermentation tank for deaeration to form a dearated mash and means for subjecting said mash to continuous aeration by addition of air, the said aeration means being disposed at the bottom of the fermentation tank, a housing forming part of said aeration means, the said housing having a cross section increasing towards the fermentation tank, wall means forming a circumferential air space in said housing, a perforated tubular body extending along the central axis of said housing, means for introducing fresh air into said circumferential air space and from there at selected places into said housing, and means for introducing fresh air into said tubular body and therefrom into the interior of said housing, and spirally shaped guide means for the said mash extending around said tubular body, the said guide means having a cross sectional diameter increasing in correspondence to the increase of the diameter of said aeration housing.

3. In the apparatus of claim 2, the spiral shaped guide means being in the form of a continuous worm gear wrapped around said tubular body.

4. In an apparatus for use in the production of fermentation products by means of maximum aeration of fermentable liquids, a fermentation tank, means for conducting the fermentable liquid outside said fermentation tank for deaeration to form a deaerated mash and means for subjecting said mash to continuous aeration by addition of air, the said aeration means being disposed at the bottom of the fermentation tank, a housing forming part of said aeration means, the said housing having a cross section increasing towards the fermentation tank, wall means forming a circumferential air space in said housing, a perforated tubular body extending along the central axis of said housing, means for introducing fresh air into said circumferential air space and from there at selected places into said housing, and means for introducing fresh air into said tubular body and therefrom into the interior of said housing, and spirally shaped guide means for the said mash extending around said tubular body, the said guide means having a cross sectional diameter increasing in correspondence to the increase of the diameter of said aerating housing, the said means for introducing air to said housing through said circumferential air space and central tubular body having a dimension and providing a pressure to obtain a mixture of fermentation liquid and air in a relative volume relation of 1:1.

References Cited in the file of this patent
UNITED STATES PATENTS

| | | |
|---|---|---|
| 2,519,902 | Haller | Aug. 22, 1950 |
| 2,635,069 | Baker | Apr. 14, 1953 |
| 2,995,497 | Heden | Aug. 8, 1961 |
| 3,013,950 | Gavin | Dec. 19, 1961 |